(12) United States Patent
Bratina et al.

(10) Patent No.: US 7,513,929 B2
(45) Date of Patent: *Apr. 7, 2009

(54) OPERATION OF IRON OXIDE RECOVERY FURNACE FOR ENERGY SAVINGS, VOLATILE METAL REMOVAL AND SLAG CONTROL

(75) Inventors: James E. Bratina, Greenwood, IN (US); Kim M. Lenti, South Holland, IL (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 404 days.

This patent is subject to a terminal disclaimer.

(21) Appl. No.: 11/096,894

(22) Filed: Apr. 1, 2005

(65) Prior Publication Data

US 2007/0062330 A1  Mar. 22, 2007

(51) Int. Cl.
  *C21B 13/12* (2006.01)
(52) U.S. Cl. .................. 75/10.17; 75/10.63; 75/961
(58) Field of Classification Search .............. 75/10.17, 75/10.63, 961; 373/161, 140
  See application file for complete search history.

(56) References Cited

U.S. PATENT DOCUMENTS

| | | | |
|---|---|---|---|
| 2,531,964 A | 11/1950 | Bean | |
| 3,770,416 A | 11/1973 | Goksel | |
| 4,080,195 A * | 3/1978 | Widell | 75/10.16 |
| 4,082,544 A * | 4/1978 | Fredrikson | 75/10.17 |
| 4,464,197 A | 8/1984 | Calderon | |
| 4,612,041 A | 9/1986 | Matsuoka et al. | |
| 4,673,431 A | 6/1987 | Bricmont | |
| 4,675,048 A | 6/1987 | Maillet | |
| 4,762,554 A | 8/1988 | Lazcano-Navarro | |
| 4,802,919 A * | 2/1989 | Fey | 75/504 |
| 4,917,723 A | 4/1990 | Coyne, Jr. | |
| 5,013,532 A | 5/1991 | Sresty | |
| 5,139,567 A | 8/1992 | Matsuoka et al. | |
| 5,186,742 A | 2/1993 | Hoffman et al. | |
| 5,279,643 A | 1/1994 | Kaneko et al. | |
| 5,364,441 A | 11/1994 | Worner | |
| 5,474,592 A | 12/1995 | Besser et al. | |
| 5,538,532 A | 7/1996 | Keegel, Jr. | |
| 5,540,751 A | 7/1996 | Yamamoto et al. | |
| 5,567,225 A | 10/1996 | Bernard et al. | |
| 5,776,420 A * | 7/1998 | Nagel | 422/184.1 |
| 6,083,294 A | 7/2000 | Hara et al. | |
| 6,102,982 A | 8/2000 | Isozaki et al. | |
| 6,136,059 A | 10/2000 | Zoppi | |
| 6,221,124 B1 | 4/2001 | Blom | |
| 6,342,086 B1 | 1/2002 | Shver | |
| 6,395,060 B1 | 5/2002 | Horne et al. | |
| 6,438,154 B2 | 8/2002 | Vallomy | |
| 6,464,753 B2 | 10/2002 | Horne et al. | |
| 6,562,096 B1 | 5/2003 | Price et al. | |
| 6,562,101 B1 | 5/2003 | Price et al. | |

(Continued)

*Primary Examiner*—Roy King
*Assistant Examiner*—Tima M McGuthry-Banks
(74) *Attorney, Agent, or Firm*—Butzel Long

(57) ABSTRACT

A method of operating a channel induction furnace so as to receive electric arc furnace (EAF) dust, basic oxygen furnace (BOF) sludge/dust and/or other iron and volatile metals containing materials as a feed stream on a batch, continuous or semi-continuous basis together with a iron-containing material feed, and therefrom produce an iron-containing hot metal or pig iron product while recovering iron value from the feed materials and recovering volatile metal components contained in the feed materials.

21 Claims, 4 Drawing Sheets

U.S. PATENT DOCUMENTS

| | | |
|---|---|---|
| 6,602,322 B2 | 8/2003 | McClelland |
| 6,682,586 B2 | 1/2004 | Frame et al. |
| 6,831,939 B2 * | 12/2004 | Bratina et al. .................. 373/7 |
| 6,932,853 B2 | 8/2005 | Bratina |
| 2003/0136226 A1 * | 7/2003 | Gripenberg et al. ........... 75/770 |
| 2004/0091014 A1 | 5/2004 | Bratina et al. |
| 2005/0083988 A1 | 4/2005 | Schaefer |
| 2005/0247162 A1 | 11/2005 | Bratina |

* cited by examiner

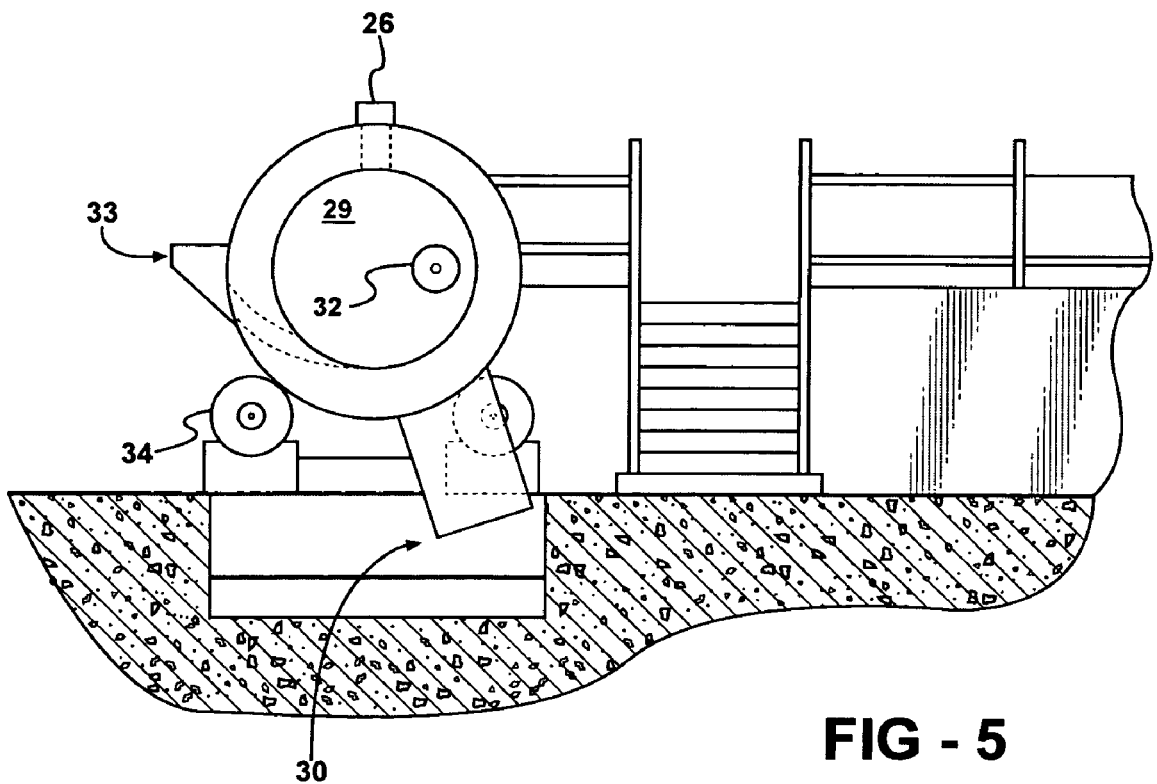
FIG - 5
FIG - 6
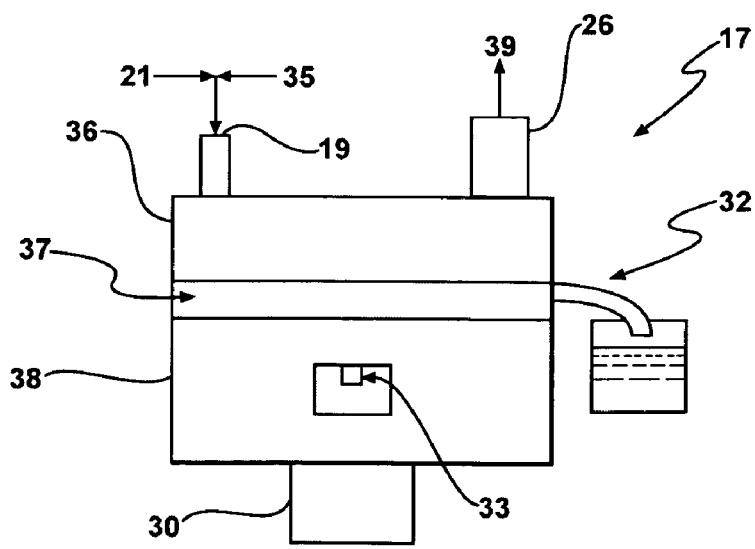

OPERATION OF IRON OXIDE RECOVERY FURNACE FOR ENERGY SAVINGS, VOLATILE METAL REMOVAL AND SLAG CONTROL

TECHNICAL FIELD

The present invention relates to the methods and processes for processing waste materials such as electric arc furnace dust (EAF), basic oxygen furnace sludge, mill scale, galvanizing sludge/dust, batteries and other materials while producing metal products and recovering iron and volatile metals. More particularly, the present invention relates to methods and process for processing waste materials that involve the separation of volatile metals, slag and iron in an energy efficient manner.

BACKGROUND ART

There are many waste materials that are generated during the production of steel and in other manufacturing processes. During the production of steel, electric arc furnace (EAF) dust and basic oxygen furnace (BOF) dust/sludge are captured and collected for either disposal or recycle.

The major components in these dusts are iron (up to 60 wt. %) and zinc (up to 30 wt. %), usually in the oxide form. In addition, these dusts contain smaller quantities of calcium, magnesium, manganese, chloride, lead, cadmium and other trace elements. The steel industry generates about 30 to 40 pounds of these types of dust for each ton of steel produced in steel making facilities. The estimated generation of these dusts in the United States in 1997 was in excess of one million tons with nearly half of it being disposed in landfills.

EAF dust is a listed hazardous waste (K061) under United States environmental regulations. Under this regulatory program, EAF dust is subject to specific record keeping, handling requirements and processing costs when it is recycled or disposed of. BOF sludge/dust is not a listed hazardous waste, but the lack of adequate reuse options results in a large quantity of this material being disposed of in landfills.

Both EAF dust and BOF sludge/dust contain significant quantities of iron that make these materials valuable for use directly in steel making processes as a substitute for other iron containing materials such as scrap steel, hot metal, sinter dust, and other iron oxides present at steel making facilities. In addition, EAF dust also contains significant quantities of zinc which makes it valuable as a feed for zinc manufacturing processes. BOF sludge/dust contains smaller quantities of zinc, but the zinc present can be recovered for reuse as a zinc product.

Present methods for handling EAF dust include processing it in Waelz kilns, rotary hearth furnaces, and flame reactor processes to recover zinc. EAF dust is also subject to stabilization processes followed by landfill disposal. A small quantity of BOF sludge/dust is returned to the BOF steel making process in some locations and some is recycled in other manners, but a large volume is disposed as a waste material in landfills.

Generally, it can be economical to subject EAF dust having a high zinc content to existing zinc recovery procedures, and send EAF dust having a low zinc content to landfills for disposal as a waste. Since hot metal is the only energy source in BOF facilities, only a limited quantity (approximately 20% of the total steel production rate) of scrap and other solid feed materials that require energy for their use in the BOF process can be added to the charge mix. This limits the quantity of BOF sludge/dust that can be returned to the BOF steel making process. As a result some portion of the BOF sludge/dust is usually sent to landfills for disposal.

Other process methods for recovering zinc and/or iron from EAF dust and BOF sludge/dust have been attempted with limited success. Such processes include thermal processes, hydrometallurgical processes or combinations thereof. In most cases, these processes were not successful because they are expensive to build, expensive to operate and/or they cannot be used to process all of the EAF dust and BOF sludge/dust material, so that waste material remains that still must be disposed of in landfills.

In addition, any processes that treat EAF dust are subject to significant environmental regulatory requirements under the Resource Conservation and Recovery Act ("RCRA"). This is due to the fact that current processes have been specifically developed for the sole purpose of processing EAF dust as a hazardous waste. To date, those in the steel industry view EAF dust as a listed hazardous waste, and accordingly logically conclude that using EAF dust as any type of feed or reactant will necessarily result in the formation, generation or preservation of a hazardous material.

Southwick, "Recovery of Iron and Zinc From Steel Mill Wastes," a presentation from a Conference Organized by Gorham/Inertech in Pittsburgh, Pa. on May 17-19, 1999 provides a summary of various processes proposed to recover iron and zinc from mill wastes. In addition, U.S. Pat. Nos. 4,605,435, 5,013,532, 5,082,493, 5,435,835, 5,439,505, 5,493,580, 5,538,532, 5,667,553, 5,879,617, 5,993,512, 6,102,982, 6,120,577, and 6,221,124 are directed to various methods and apparatus for processing EAF dust.

U.S. Pat. No. 6,136,059 to Zoppi discloses the use of an induction furnace for the sole purpose of processing EAF dust. That is, the only feed into the induction furnace after providing a "heel" for the required oxidation and reduction reactions is a half charge of cast iron which is not replenished, but rather to which pellets of EAF dust is added together with coal and small amounts of slagging agents. Zoppi mentions that induction furnaces of the prior art are generally only used as a smelting means in secondary steel and non-ferrous metals processing.

U.S. Pat. No. 6,831,939 to Bratina and Fehsenfeld discloses an expansion of the Zoppi patent that involves operating an induction furnace to both produce hot metal and a pig iron product and to process iron and volatile metal containing materials to recover iron value and concentrate metals which are volatile at the operating temperature of the induction furnace. The process relies upon mixing feeding both metal oxides and reduction material into the induction furnace. The efficiency of the process is limited by the induction furnace that is used.

Other patents that discuss the use of induction furnaces in smelting processes that involve steel processing dust include U.S. Pat. Nos. 5,980,606, 5,304,230, 5,249,198, 5,188,658, 4,878,944, 4,802,919, 4,762,554, 4,612,041, and 4,403,327.

The present invention is directed a method of configuring and operating an induction furnace for processing waste materials while producing metal products and recovering iron and volatile metals in a manner that is energy efficiency and provides improved separation of volatile metals and improved control of slag viscosity.

DISCLOSURE OF THE INVENTION

According to various features, characteristics and embodiments of the present invention which will become apparent as the description thereof proceeds, the present invention provides a method of processing a volatile metal containing steel furnace dust and optionally other materials as a feedstock containing iron and volatile metals which involves:

feeding an iron-containing material into a channel induction furnace containing molten iron on a batch, continuous or semi-continuous basis;

feeding a volatile metal containing material into the channel induction furnace on a batch, continuous or semi-continuous basis;

allowing a controlled amount of oxygen to enter the induction furnace so as to control at least one of:
  i) the temperature of headspace above a molten bath in the induction furnace; and
  ii) the and the amount of carbon dioxide in the headspace; and obtaining an iron-containing product on a batch, continuous or semi-continuous basis and recovering volatile metals.

The present invention also provides a method of processing iron and volatile metal containing material which involves:

providing a channel induction furnace;

feeding an iron-containing material into the channel induction furnace on a continuous or semi-continuous basis;

feeding the volatile metal containing feed material together with the volatile metal components therein into the channel induction furnace with the iron-containing material;

allowing a controlled amount of oxygen to enter the induction furnace so as to control at least one of:
  i) the temperature of headspace above a molten bath in the induction furnace; and
  ii) the and the amount of carbon dioxide in the headspace; and obtaining an iron-containing product on a continuous or semi-continuous basis and recovering volatile metals.

The present invention further provides a method of operating a channel induction furnace which involves:

feeding an iron containing feed material to a channel induction furnace on a batch, continuous or semi-continuous basis;

feeding a volatile metal containing material into the channel induction furnace as a feedstock on a batch, continuous or semi-continuous basis;

allowing a controlled amount of oxygen to enter the induction furnace so as to control at least one of:
  i) the temperature of headspace above a molten bath in the induction furnace; and
  ii) the and the amount of carbon dioxide in the headspace;
  recovering iron from the channel induction furnace on a continuous or semi-continuous basis; and
  recovering volatile metals.

BRIEF DESCRIPTION OF DRAWINGS

The present invention will be described with reference to the attached drawings which are given as non-limiting examples only, in which:

FIG. 5 is a side view of the channel induction furnace of FIG. 3.

FIG. 6 is a schematic drawing of the channel induction furnace of FIGS. 3-5 which is provided to illustrate how the process of the present invention works according to one embodiment.

BEST MODE FOR CARRYING OUT THE INVENTION

Figure 1:
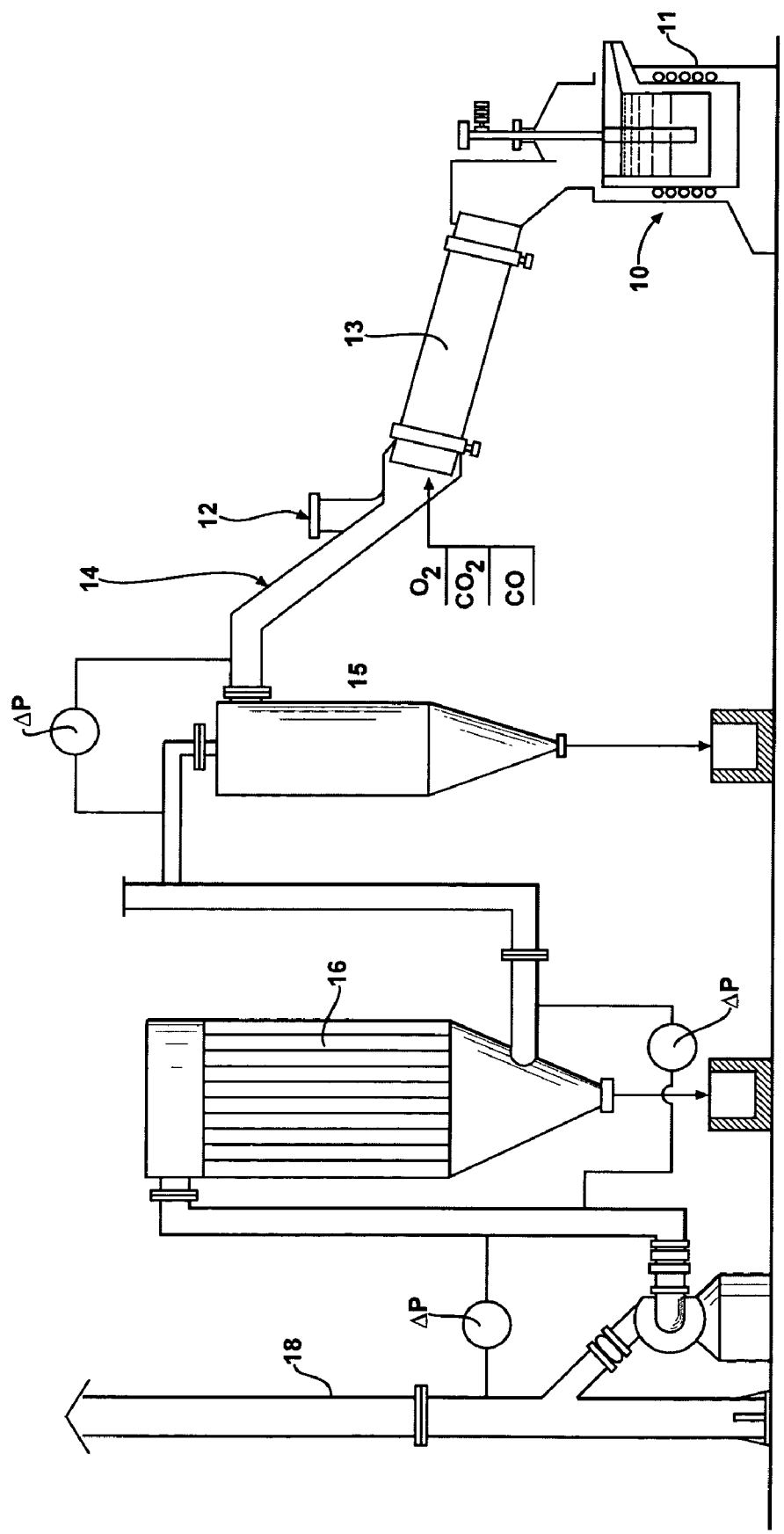
FIG. 1 depicts a prior art system that uses an induction furnace for the sole purpose of processing EAF dust to produce pig iron and volatile metal products.

The present invention is generally directed to methods and apparatus that involve the use of an induction furnace for processing waste materials while producing metal products and recovering iron and volatile metals. More particularly, the present invention involves a method of configuring and operating an induction furnace for processing waste materials while producing metal products and recovering iron and volatile metals in a manner that is energy efficient and provides improved separation of volatile metals and improved control and removal of slag. Waste materials that can be processed according to the present invention include iron and volatile metal containing materials such as EAF dust and BOF sludge/dust from steelmaking operations which can be used as a feed stream into the induction furnace for iron recovery and concentration and/or recovery of volatile metals such as zinc, lead, cadmium, etc. Other wastes that can be processed include mill scale, galvanizing sludge/dust, batteries and other materials.

The configuration of the induction furnace used according to the present invention allows for: 1) operating the furnace with a high gas temperature in the headspace of the furnace by controlling the flow of excess air into the furnace; 2) operating the furnace to allow a minimum quantity of air to combust a portion of the carbon monoxide in the gas headspace to provide additional heat in the headspace and allow the gas headspace to remain in a reducing state to prevent zinc and other volatile metals from being oxidized; 3) controlling the chemistry of slag formed in the process with additions of agents such as silica (or lime) either as separate materials or by incorporation into a briquette mix feeding the furnace to product a fluid slag material that can be easily removed from the furnace; 4) providing a feed location at the opposite end of the gas and slag removal locations to allow for a plug flow type reactor that provides an extended reaction time for the process, allowing for more complete separation of the slag and feed materials in the process; and 5) providing a channel type induction furnace that allows a more energy efficient furnace to be used with thicker refractory sections that both reduce the heat loss from the process and allow for longer periods of operation between the replacement of refractory lining material.

The improved energy and separation efficiency of the present invention serves to provide for a system that will be capable of processing a wider variety of feed materials in a more cost effective manner than previous processes.

The apparatus used for the present invention includes a channel type induction furnace as its main component that has an inductor at the bottom or other suitable lower portion of the furnace body. This feature allows the furnace to be designed in a more energy efficient manner by incorporating a thicker layer of refractory in the main body (drum portion) of the furnace. This thicker refractor also provides for longer period of time between the need for refractory replacement. While the use of an induction furnace of this type is not unique per se, the use of such an induction furnace for producing metal products and recovering iron and volatile metals according to the process of the present invention is unique as evidenced by the specific features and operating methods described herein which yield significant improvements over prior art processes.

The use of a channel type induction furnace also allows additional improvements to be made in the form of energy efficiency. The body of the furnace is a horizontal drum that can be enclosed to thereby allow the flow of air into the process to be restricted and controlled. The restriction of air flow into the drum limits the quantity of air that is heated in the furnace and removed by the gas control system on the furnace, thus reducing the heat lose to the air that is normal for typical induction furnace operation. The air that enters the furnace burns a portion of the carbon monoxide generated by the metal reduction process in the furnace. This burning of the carbon monoxide provides additional heat in the gas headspace of the furnace thereby allowing the furnace to operate with a higher temperature in the headspaced than is normal for operation. The high temperature of the gas headspace achieved by the process of the present invention, which can range from about 1,300° C. to about 1,500° C., eliminates or greatly reduces heat loss from the surface of the furnace bath and thereby allows the slag on the surface of the bath to be maintained at a higher temperature.

The flow of air into the furnace can also be controlled as desired to limit the air to a level at which carbon monoxide formed as a result of the metal oxidation reduction process in the system will not be completely oxidized. By keeping excess carbon monoxide in the gas headspace of the furnace the system will be operated in a reducing mode until the gases exit the furnace. When operating in the reducing mode volatile metals such as zinc, lead and cadmium (in the vapor form) are prevented from being oxidized in the furnace before they are removed. This manner of operating limits oxidized volatile metals from being deposited in the slag leaving the furnace. As a result, a cleaner slag is maintained during the process.

In addition to maintaining a cleaner slag, the present invention provides for the ability to make a higher quality fluid slag that is easier to remove from the induction furnace process. This is accomplished in three ways. First, as discussed above, the air flow into the furnace can be controlled according to the present invention to produce a higher temperature gas headspace. This higher temperature in the gas headspace provides heat to the surface of the slag. The higher temperature in the gas headspace which is not provided by typical operation of an induction furnace prevents and can actually reverse normal loss of heat from the slag surface thereby, in either event, providing a higher temperature for the slag layer. As a result, the fluidity of the slag is increased as compared to the manner in which an induction furnace is typically operated.

Second, according to the present invention, the chemistry of the slag layer can be adjusted to provide a more fluid slag. This is accomplished by adding silica, lime or some other material or known slagging agent to improve the fluidity and quality of the slag.

Third, the induction furnace used according to the present invention is provided with a feed at one end of the furnace and slag/gas removal at the opposite end. This arrangement provides a reaction zone that provides an increase process retention time. This increase in retention time is provided by plug flow movement of the slag on the surface of the iron bath from the feed point to the slag discharge point. The retention time provides more time for volatile metals to react and leave the slag surface before the slag is removed from the furnace. The removed slag therefore has a lower concentration of volatile metals and the proper chemistry for value as an aggregate for road construction applications.

The present invention will be discussed with reference to FIGS. 1-6 in which common reference numeral have been used to identified similar or common elements where possible to avoid having to repeat descriptions of such similar or common elements.

FIG. 1 depicts a prior art system that uses an induction furnace for the sole purpose of processing EAF dust. In FIG. 1 an induction furnace 10 which can be of the coreless (or channel) type is shown, inside of which, a charge of molten cast iron 11 is depicted as only partially filling the induction furnace 10. Charge 11 is consequently present as a molten bath under turbulent conditions inside the induction furnace 10 owing to the effect of the high intensity induced currents that are typical in induction furnaces.

The dusts from electrical steelworks, rich in zinc and iron oxides, are fed to induction furnace 10 through an inlet 12, and they are thus obliged to flow along an inclined drum 13, in countercurrent relative to the flow of hot air leaving induction furnace 10. The reaction heat generated inside the induction furnace 10 is thus used to dry and pre-heat the dusts while they are flowing towards induction furnace 10.

The oxides of non-ferrous metals leave the induction furnace 10 entrained by the stream of hot gas rich in CO. The reaction of CO with the hood air:

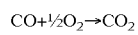

takes place during the passage of the fumes through inclined drum 13, along which the moist dust pellets which flow downwards, countercurrently relative to the fumes.

Upon leaving drum 13, the exhaust gases undergo a first cooling by the addition of air in a passage 14 and enter a cyclone 15 in which the coarsest and heaviest components are removed. The complete dust removal takes place inside a sock or bag filter 16 that can be of a "pulse-jet" type, installed upstream from a chimney 18.

The volatile metal oxides contained within the pre-heated, dried dust entering the induction furnace 10 are subject to reduction within the bath contained in the induction furnace 10 so that their volatile metal vapors are released. As the volatile metal vapors leave the bath they are oxidized and the volatile metal oxides are collected in the sock or bag filter for collection and recovery of zinc, lead, cadmium, etc.

Figure 2:
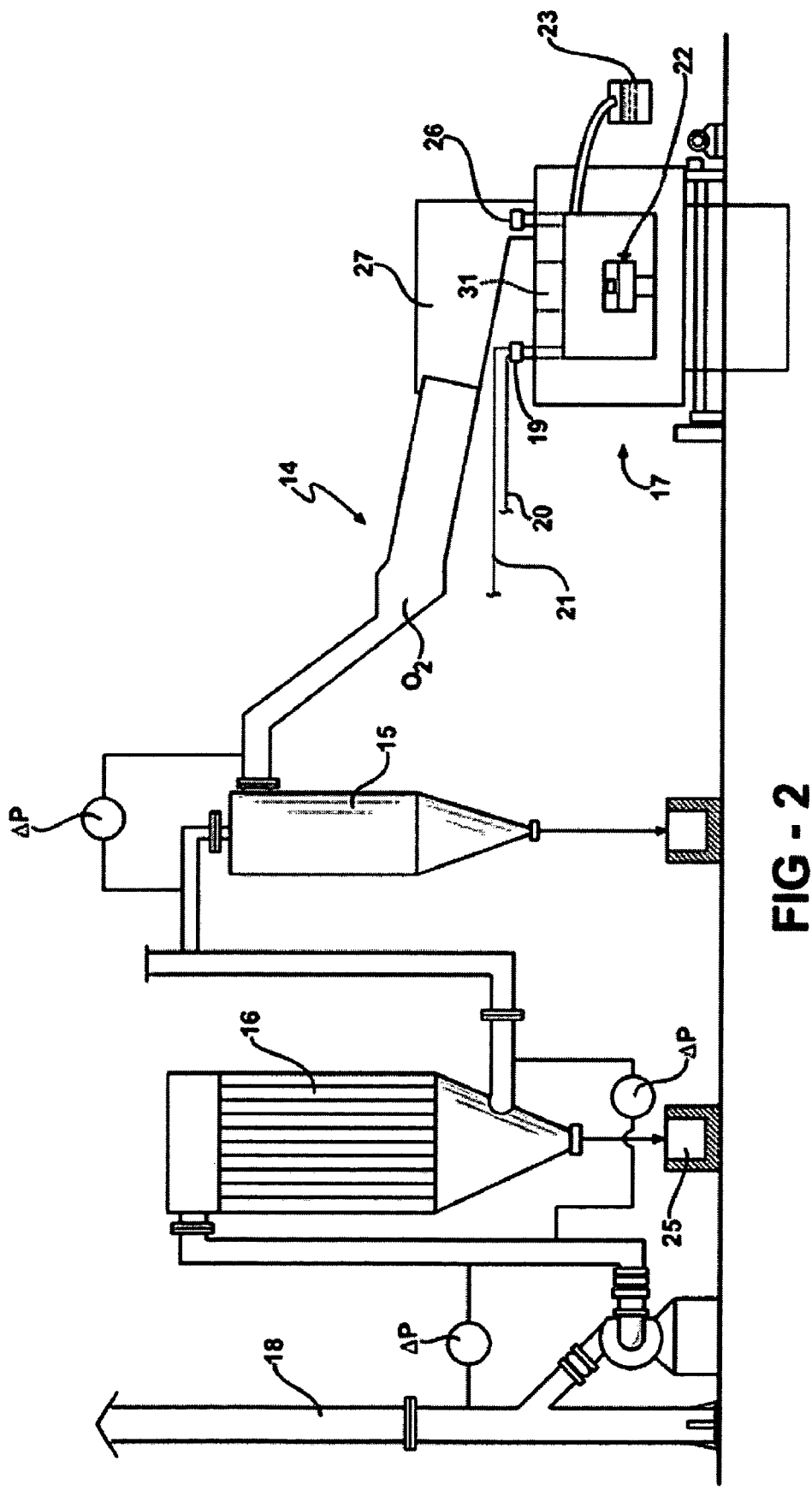
FIG. 2 depicts a system according to one embodiment of the present invention that uses an induction furnace to both produce hot metal (or pig iron) and to recover iron value from iron and volatile metal containing materials, including EAF dust while concentrating volatile metals such as zinc, lead, cadmium, etc.

FIG. 2 depicts a system according to one embodiment of the present invention that uses a channel induction furnace 17 to both produce hot metal or pig iron and to recover iron value from EAF dust or other iron and volatile metals containing materials while concentrating volatile metals such as zinc, lead, cadmium, etc. The system depicted in FIG. 2 is similar to that depicted in FIG. 1 except for the materials that are charged into and removed from the channel induction furnace 17. In addition to the elements depicted in FIG. 1 and discussed above and identified by the same reference numerals in FIG. 2, FIG. 2 further includes a charge or feed stream 20 for feeding or charging scrap steel, hot metal, sinter dust, basic oxygen furnace ("BOF") sludge and other iron oxide-containing materials into inlet 19 of the channel induction furnace 17, and another charge or feed stream 21 for feeding or charging the iron and volatile metals containing materials into the inlet 19 of the channel induction furnace 17. It is to be understood that the materials depicted as being fed or charged into the channel induction furnace 17 in charge or feed streams 20 and 21 could be combined and fed or charged into the inlet 19 of the channel induction furnace 17.

FIG. 2 also depicts a product stream 22 which represents hot metal product or pig iron such as an iron product that is discharged from the channel induction furnace 17, and identifies by reference numeral 25 the collection point where oxides of zinc, lead, cadmium and other volatile metals are recovered in the manner taught by U.S. Pat. No. 6,136,059 to Zoppi, from which patent prior art FIG. 1 is taken. These collected volatile metal oxides can be subsequently processed to recover the volatile metals according to conventional processes. FIG. 2 also depicts a slag stream 23 which represents where slag is removed from the channel induction furnace 17.

Figure 3:
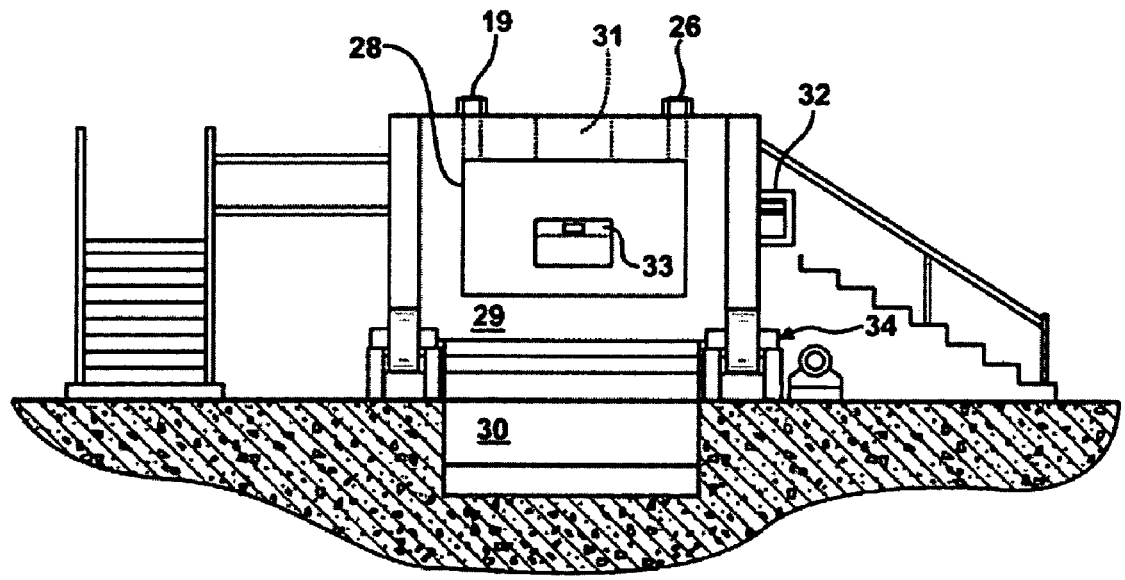
FIG. 3 is a front view of a channel induction furnace used according to one embodiment of the present invention.
Figure 4:
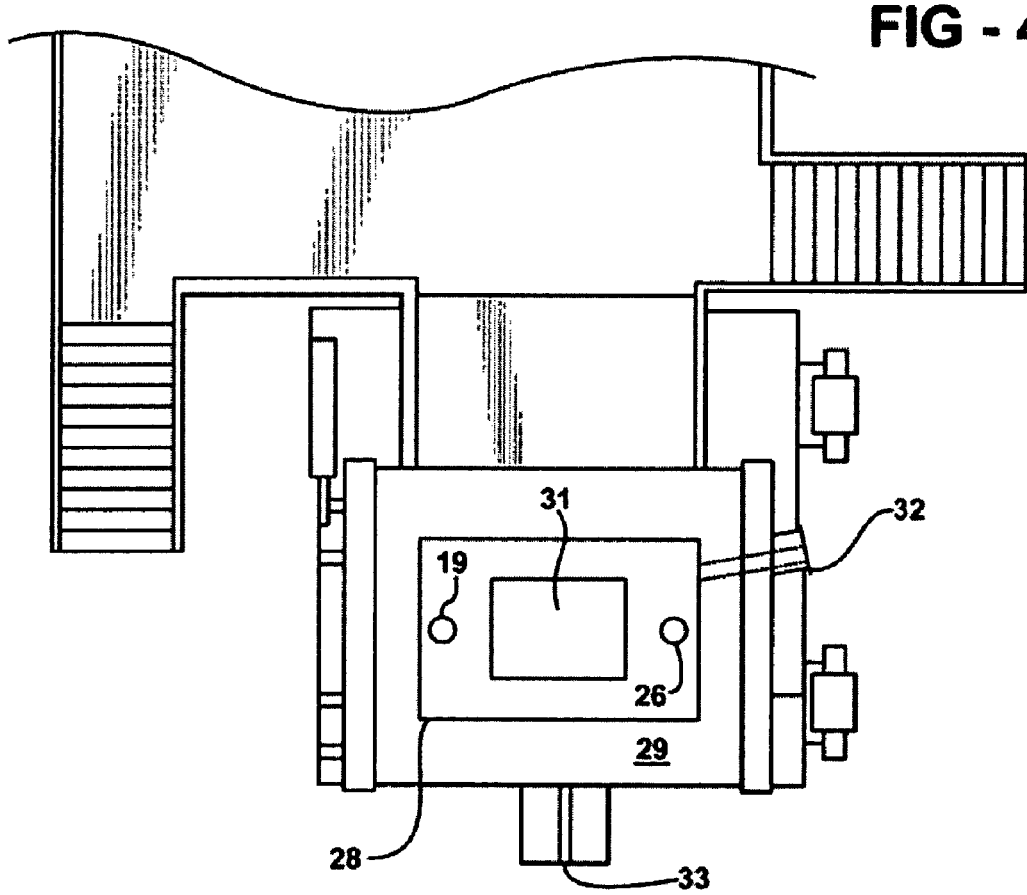
FIG. 4 is a top view of the channel induction furnace of FIG. 3.

FIG. 3 is a front view of a channel induction furnace used according to one embodiment of the present invention. FIG. 4 is a top view of the channel induction furnace of FIG. 3. FIG. 5 is a side view of the channel induction furnace of FIG. 3. The channel induction 17 furnace in FIGS. 3-5 is configured to operated in a continuous fashion to process feed materials while producing hot metal or pig iron, concentrating volatile metals such as zinc, lead cadmium, etc. and slag. It is also possible to operate the furnace in a batch or semi-continuous batch manner. In addition, the channel induction furnace 17 is configured to remove slag in a continuous manner and is configured to have a gas outlet 26 that can be coupled hood 27 shown in FIG. 2. It is also possible to remove the slag in a batch or semi-continuous batch manner.

The channel induction furnace 17 generally includes a drum- or cylindrical-shaped chamber 28 that is surrounded and defined by a refractory material 29 that is provided as a liner. The use and installation of such refractory liners in channel induction furnaces is known as are the refractory materials themselves. An inductor 30 of conventional design is provided at a bottom portion of the drum-shaped chamber 28 and used to form and maintain the molten bath in the channel induction furnace 17.

At the top of the channel induction furnace 17 an inlet 19 for feeding materials into the furnace 17 is provided near one end and an outlet 26 for removal of gases is provided at an opposite end as shown. The channel induction furnace 17 can also be provided with an access port_that is generally closed during operation. The access port 31 is shown as being centrally located at the top of the furnace 17.

A slag discharge 32 is provided at one end of the channel induction furnace 17 at a height that is suitable for controlling a slag layer that forms on a molten bath within the furnace 17. The slag discharge 32 comprises a trough or channel structure that extends from the side of the channel induction furnace 17 and is in fluid communication with the drum- or cylindrical-shaped chamber 28. The slag discharge 32 can be provided with a gate or movable dam that can be used to control slag discharge.

The channel induction furnace 17 is also provided with a spout 33 in the front of the furnace 17 through which molten metal from the molten bath can be removed from the drum- or cylindrical-shaped chamber 28. In this regard, the channel induction furnace 17 is provided with a mechanism generally identified by reference number 34 which is used to rotate the drum- or cylindrical-shaped chamber 28 about its central axis in a known manner so that molten metal in the molten bath can flow out through the spout 33.

FIG. 6 is a schematic drawing of the channel induction furnace of FIGS. 3-5 which is provided to illustrate how the process of the present invention works according to one embodiment. As shown, the inductor 30 is located at the bottom of the induction furnace 17 where it is in communication with the drum- or cylindrical-shaped chamber 28 discussed above. A feed stream 21 that comprises scrap steel, hot metal, sinter dust, EAF dust, basic oxygen furnace (BOF) sludge and other iron oxide-containing materials enters the furnace continuously through inlet 19 provided in the top of the furnace 17 near one end. Slag conditioning material 35 such as silica, lime, etc. can be added to the process through inlet 19 which is at the opposite end of the drum- or cylindrical-shaped chamber 28 than the slag discharge 32. As the feed material enters the furnace through inlet 19 it falls through the gas headspace 36 onto the surface of the slag layer 37. The feed material increases in temperature due to the operating temperatures of the furnace and its components react to form iron metal, slag and volatile materials.

Iron, having a high density, passes through the slag layer 37 into the iron liquid metal bath 38 in the bottom portion of the furnace 17. The inductor 30 provides energy for the iron metal bath 38 from electrical power to keep the bath 38 at a desired operating temperature. The liquid iron 38 is removed from the system through a spout 33 at the front of the furnace 17.

Slag, which has a lower density than liquid iron, will float on the surface of the iron bath 38 toward the slag discharge 32 at the opposite end of the furnace 17 from the inlet 19. The slag will be kept fluid by a combination of high temperature in the gas headspace 36 and slag conditioning additives that improve the slag viscosity as discussed above. The slag can be removed continuously or semi-continuously as desired by the system operation. The travel time from the addition of new feed material to the discharge of its slag components can be adjusted by changing the depth or thickness of the slag layer 37 in the furnace 17 or changing the surface area of the liquid levels in the furnace through equipment design changes.

Gases produced from the process will be a combination of carbon monoxide, carbon dioxide and volatile metal vapors. Some air can be added to the system with the feed material stream 21 and at the slag discharge 32. The oxygen in this added air will burn a portion of the carbon monoxide within the gas headspace to add additional heat to the gas headspace 36 area. If too much air is added or allowed to enter at these points, all of the carbon monoxide present in the gas headspace 36 will be burned followed by the burning or oxidation of a portion of the metal vapors. If the metal vapors are allowed to burn or oxidize they will form metal oxides that could condense in the furnace and into the slag layer 37. This undesired burning or oxidation of metal vapors would result in a lower percentage of volatile metal recovery and an increase in unwanted materials in the slag layer.

The present invention according involves operating the system with control of the air entering the furnace in order to provide the proper gas headspace 36 operating temperature and limit oxygen entering the gas headspace 36. The gas stream 39 exiting the furnace 17 will be reacted with air as indicated in FIG. 2 as it leaves the furnace 17 to oxidize the volatile metals so that they can be collected in the manner taught by U.S. Pat. No. 6,136,059 to Zoppi and U.S. Pat. No. 6,831,939 to Bratina and Fehsenfeld. In addition, cooling of the exiting gases is accomplished at area 14 in the system to condense volatile metal oxides that are to be recovered. Volatile metals that can be recovered include zinc, lead, cadmium and others which may be present as elemental metals, halides or oxides. These collected volatile metal materials can be subsequently processed to recover the volatile metals according to conventional processes.

In operation, the slag layer 37 can be removed and consequently reduced in thickness until the surface of the underlying molten metal layer approaches the height of the slag discharge 32, before which the drum- or cylindrical-shaped chamber 28 can be rotated about its central axis so that molten metal in the bath 38 can flow out through the spout 33.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method of processing iron and volatile metal containing material which comprises:
   providing a channel induction furnace having opposite ends, an unobstructed interior space between the opposite ends, at least one inlet for feeding material into the channel induction furnace at one of the opposite ends, and a slag discharge outlet at another one of the opposite ends for removing slag from the channel induction furnace;
   feeding an iron-containing material into one of the said at least one inlets on a continuous or semi-continuous basis;
   feeding the volatile metal containing feed material together with the volatile metal components therein into one of the said at least one inlets with the iron-containing material;
   allowing a controlled amount of oxygen to enter the channel induction furnace so as to control at least one of:
      i) the temperature of headspace above a molten bath in the channel induction furnace; and
      ii) the amount of carbon dioxide in the headspace; and
   obtaining an iron-containing product on a continuous or semi-continuous basis and recovering volatile metals.

2. A method according to claim 1, wherein the iron-containing material comprises at least one of scrap steel, hot metal and sinter dust.

3. A method according to claim 1, wherein the volatile metals comprise at least one of zinc, lead and cadmium.

4. A method according to claim 1, wherein the volatile metals are recovered by releasing the volatile metals as vapors from the channel induction furnace and recovering the volatile metal vapors.

5. A method according to claim 1, further comprising controlling at least one of:
   i) the viscosity of a slag layer in the channel induction furnace; and
   ii) the chemistry of a slag layer in the channel induction furnace.

6. A method according to claim 5, wherein one of more chemical agents are added to the slag layer.

7. A method according to claim 1, wherein at least one of the iron and volatile metals containing material is produced at a facility that is different from the facility having the channel induction furnace.

8. A method according to claim 1. wherein the iron-containing material and the volatile containing feed material comprise a single source feed material.

9. A method according to claim 8, wherein the single feed material comprises at least one of electric arc furnace dust, basic oxygen furnace sludge/dust, mill scale, and galvanizing sludge/dust.

10. A method according to claim 9, wherein the single feed material comprises one of electric arc furnace dust.

11. A method of processing iron and volatile metal containing material which comprises:
   providing a channel induction furnace having opposite ends, an unobstructed interior space between the opposite ends, an inlet for feeding material into the channel induction furnace at one of the opposite ends, and a slag discharge outlet at another one of the opposite ends for removing slag from the channel induction furnace;
   forming a molten bath in the channel induction furnace;
   feeding an electric arc furnace dust into the inlet on a continuous or semi-continuous basis;
   allowing a controlled amount of oxygen to enter the induction furnace so as to control at least one of:
      i) the temperature of headspace above the molten bath in the channel induction furnace; and
      ii) the amount of carbon dioxide in the headspace; and
   obtaining an iron-containing product on a continuous or semi-continuous basis and recovering volatile metals.

12. A method of processing iron and volatile mets containing material according to claim 11, wherein the recovered volatile metals comprise at least one of zinc, lead and cadmium.

13. A method of processing iron end volatile metal containing material according to claim 11, wherein the volatile metals are recovered by releasing the volatile metals as vapors from the channel induction furnace and recovering the volatile metal vapors.

14. A method of processing iron and volatile metal containing material according to claim 11, wherein a the molten metal bath is maintained in the channel induction furnace and the iron from the electric arc furnace dust is collected in the molten metal bath.

15. A method of processing iron and volatile metal containing material according to claim 11, further comprising controlling at least one of:
   i) the viscosity of a slag layer in the channel induction furnace; and
   ii) the chemistry of a slag layer in the channel induction furnace.

16. A method of processing iron and volatile metal containing material according to claim 15, wherein one of more chemical agents are added to the slag layer.

17. A method according to claim 11, wherein the electric arc furnace dust is produced at a facility that is different from the facility having the channel induction furnace.

18. A method of processing iron and volatile metal containing material according to claim 1, wherein slag is removed continuously or semi-continuously from the channel induction furnace.

19. A method of processing iron and volatile metal containing material according to claim 11, wherein slag is removed continuously or semi-continuously from the channel induction furnace.

20. A method of processing iron and volatile metal containing material according to claim 1, wherein a controlled amount of oxygen is allowed to enter the channel induction furnace to maintain a reducing atmosphere within the channel induction furnace.

21. A method of processing iron and volatile metal containing material according to claim 11, wherein a controlled amount of oxygen is allowed to enter the channel induction furnace to maintain a reducing atmosphere within the channel induction furnace.

* * * * *